US011562563B2

(12) United States Patent
Xian et al.

(10) Patent No.: US 11,562,563 B2
(45) Date of Patent: Jan. 24, 2023

(54) AUTOMATIC CROP CLASSIFICATION SYSTEM AND METHOD

(71) Applicant: Farmers Edge Inc., Winnipeg (CA)

(72) Inventors: Changchi Xian, Lethbridge (CA); Jacob Walker Bengtson, Houston, TX (US)

(73) Assignee: Farmers Edge Inc., Winnipeg (CA)

( * ) Notice: Subject to any disclaimer, the term of this patent is extended or adjusted under 35 U.S.C. 154(b) by 168 days.

(21) Appl. No.: 16/926,946

(22) Filed: Jul. 13, 2020

(65) Prior Publication Data

US 2021/0019522 A1    Jan. 21, 2021

Related U.S. Application Data

(60) Provisional application No. 62/875,105, filed on Jul. 17, 2019.

(51) Int. Cl.
  *G06V 20/10*    (2022.01)
  *G06N 3/08*    (2006.01)
  *G06K 9/62*    (2022.01)

(52) U.S. Cl.
  CPC ......... *G06V 20/188* (2022.01); *G06K 9/6223* (2013.01); *G06K 9/6268* (2013.01); *G06N 3/088* (2013.01)

(58) Field of Classification Search
  CPC combination set(s) only.
  See application file for complete search history.

(56) References Cited

U.S. PATENT DOCUMENTS

| 7,058,197 B1 * | 6/2006 | McGuire | G06V 20/188 |
| | | | 382/108 |
| 9,638,678 B2 | 5/2017 | Shriver et al. | |

(Continued)

FOREIGN PATENT DOCUMENTS

| CN | 104166990 | * 11/2014 | ............. G06T 7/00 |
| WO | WO2009138654 | * 11/2009 | ............. G06F 19/00 |
| WO | 2009156542 | 12/2009 | |

OTHER PUBLICATIONS

Nitze, Ingmar; Schulthess, Urs; Asche, H., Comparison of Machine Learning Algorithms Random Forest, Artificial Neural Network and Support Vector Machine to Maximum Likelihood for Supervised Crop Type Classification, May 2012, ResearchGate.

(Continued)

*Primary Examiner* — Zhiyu Lu
(74) *Attorney, Agent, or Firm* — Ryan W. Dupuis; Kyle R. Satterthwaite; Ade & Company Inc.

(57) ABSTRACT

Methods and systems used for the classification of a crop grown within an agricultural field using remotely-sensed image data. In one example, the method involves unsupervised pixel clustering, which includes gathering pixel values and assigning them to clusters to produce a pixel distribution signal. The pixel distribution signals of the remotely-sensed image data over the growing season are summed up to generate a temporal representation of a management zone. Location information of the management zone is added to the temporal data and ingested into a Recurrent Neural Network (RNN). The output of the model is a prediction of the crop type grown in the management zone over the growing season. Furthermore, a notification can be sent to an agricultural grower or to third parties/stakeholders associated with the grower and/or the field, informing them of the crop classification prediction.

16 Claims, 4 Drawing Sheets

(56) References Cited

U.S. PATENT DOCUMENTS

| | | | | |
|---|---|---|---|---|
| 10,248,663 | B1* | 4/2019 | Keisler | G06N 3/0454 |
| 2013/0083312 | A1* | 4/2013 | Baraniuk | G01J 3/0229 |
| | | | | 356/402 |
| 2018/0189564 | A1 | 7/2018 | Freitag et al. | |
| 2018/0211156 | A1 | 7/2018 | Guan et al. | |
| 2019/0050948 | A1* | 2/2019 | Perry | G06Q 10/04 |
| 2019/0170860 | A1 | 6/2019 | Burke et al. | |
| 2019/0228223 | A1* | 7/2019 | McKenna | G06T 7/00 |

OTHER PUBLICATIONS

Yaping, Cai; Kaiyu, Guan; Jian, Peng; Shaowen, Wang; Christopher, Seifert; Brian, Wardlow Zhan, Li, A high-performance and in-season classification system of field-level crop types using time-series Landsat data and a machine learning approach, Feb. 2018, Elsevier Inc.

Ustener, M; Sanli, F.B.; Esetlili, M.T.; Kurucu, Y., Crop Type Classification Using Vegetation Indices of Rapideye Imagery, Oct. 2014, The International Archives of the Photogrammetry, Remote Sensing and Spatial Information Sciences, vol. XL-7.

Zhang, Huanxe; Li, Qiangzi; Lio, Jiangui; Shang, Jiali; Du, Xin; Mcnairn, Heather; Champagne, Catherine; Dong, Taifeng; Liu, Mingxu, Image Classification Using RapidEye Data: Integration of Spectral and Textual Features in a Random Forest Classifier, Dec. 2017, IEEE Journal of Selected Topics in Applied Earth Observations and Remote Sensing.

Hoberg, T; Muller, S., Multitemporal Crop Type Classification Using Conditional Random Fields and Rapideye Data, Jun. 2011, International Archives of the Photogrammetry, Remote Sensing and Spatial Information Sciences, vol. XXXVIII-4/W19.

* cited by examiner

AUTOMATIC CROP CLASSIFICATION SYSTEM AND METHOD

RELATED APPLICATIONS

This application claims the benefit under 35 U.S.C.119(e) of U.S. provisional application Ser. No. 62/875,105, filed Jul. 17, 2019.

TECHNICAL FIELD

This description relates to the classification of a crop planted within an agricultural field. More specifically, this description relates to the use of remotely-sensed image data for automatic classification of crops grown over a growing season within the field.

BACKGROUND

Remotely-sensed image data and products derived from that data (i.e., imagery products) are increasingly utilized in agriculture. This is because these data products can provide rapid, synoptic estimates of crop condition over a large number of agricultural acres. For example, an imagery product estimates crop condition for a field using a combination of features and vegetation indices derived from the observed image's spectral data. By way of illustration, an imagery product may derive a Normalized Difference Vegetation Index (NDVI) from spectral data in the imagery data. An NDVI may demonstrate high correlation between crop biomass and eventual yield, and, therefore, the imagery product may inform a decision for a farmer. NDVI and other imagery products can also provide quantitative and visual indications of deleterious crop conditions such as pest, disease, or weather damage (i.e., hail), as well as the presence of weeds.

Determining the type of crop grown in a particular agricultural field using remotely-sensed image data is useful to growers. A grower might need to provide this information to third parties or stakeholders associated with the grower and/or the field. For example, a grower might need to provide proof to his/her insurance company that a particular crop was grown, for reimbursement purposes, should there be damage to the crops for any specific reason. However, despite the utility offered by these imagery products, manual inspection of images can be time consuming and tedious. This can be particularly true for growers operating very large farming operations. Manual inspection of images and imagery products also requires expertise and experience to properly interpret the data. As such, a method to automatically classify a crop grown during a growing season is desirable.

SUMMARY

This disclosure describes various methods and systems used for the classification of a crop grown within an agricultural field using remotely-sensed image data. In one example, the method involves unsupervised pixel clustering, which includes gathering pixel values and assigning them to clusters to produce a pixel distribution signal. The pixel distribution signals of the remotely-sensed image data over the growing season are summed up to generate a temporal representation of a management zone. Location information of the management zone is added to the temporal data and ingested into a Recurrent Neural Network (RNN). The output of the model is a prediction of the crop type grown in the management zone over the growing season. Furthermore, a notification can be sent to an agricultural grower or to third parties/stakeholders associated with the grower and/or the field, informing them of the crop classification prediction.

According to one aspect of the present invention there is provided a method of classifying a crop growing within a management zone of an agricultural field during a growing season, the method comprising: (i) receiving a plurality of remotely sensed images of the management zone of the agricultural field acquired during the growing season; (ii) for each remotely sensed image, obtaining pixel values from the remotely sensed images and computing vegetation indices; (iii) for each remotely sensed image, using the computed vegetation indices to assign the pixel values into clusters defining a pixel distribution signal; (iv) transforming the pixel distribution signals of all sensed images of the management zone for the growing season into a temporal representation of the management zone; and (v) applying a recurrent neural network to the temporal representation and location information for the management zone to identify the crop growing within the management zone of the agricultural field during the growing season.

According to a second aspect of the present invention there is provided a system for classifying a crop growing within a management zone of an agricultural field during a growing season, the system comprising a memory storing programming instructions thereon and at least one processor operably coupled to the memory so as to execute the programming instructions whereby said at least one processor is configured to: (i) receive a plurality of remotely sensed images of the management zone of the agricultural field acquired during the growing season; (ii) for each remotely sensed image, obtain pixel values from the remotely sensed images and compute vegetation indices; (iii) for each remotely sensed image, use the computed vegetation indices to assign the pixel values into clusters defining a pixel distribution signal; (iv) transform the pixel distribution signals of all sensed images of the management zone for the growing season into a temporal representation of the management zone; and apply a recurrent neural network to the temporal representation and location information for the management zone to identify the crop growing within the management zone of the agricultural field during the growing season.

The method may further include classifying a crop growing within an agricultural field including a plurality of management zones. In this instance, pixel distribution signals associated with each management zone are transformed into a temporal representation associated with each management zone, and the recurrent neural network is applied to each of the temporal representations and the location information for the management zones to identify the crop growing within the management zones of the agricultural field during the growing season.

The method may further include (i) computing the vegetations indices by calculating indexed pixel values for each sensed image in which the indexed pixel values correspond to the vegetation indices calculated from original band values for the pixels in the sensed images and (ii) assigning the indexed pixel values into the clusters to define the pixel distribution signal.

The pixel values may be assigned into the clusters to define the pixel distribution signal using an unsupervised k-means clustering algorithm.

The pixel distribution signal is preferably formed as a multi-dimensional vector representing the clusters and containing a pixel distribution within each cluster. Furthermore, the temporal representation is preferably formed as a matrix comprised of a plurality of pixel distribution vectors at different time steps during the growing season in which each pixel distribution vector of the matrix represents a plurality of the pixel distribution signals at a common one of the time steps during the growing season.

Each pixel distribution vector of the matrix that is associated with one time step of the matrix is preferably formed by summing and normalizing the pixel distribution signals associated with that time step.

Identifying the location information for each management zone may include converting coordinate information associated with the management zone into a universal coordinate system usable by the recurrent neural network.

The method may further include filtering the remotely sensed images to produce filtered images and obtaining the pixel values only from the filtered images. Filtering the remotely sensed images may include (i) correcting raw image data to top of atmosphere reflective units for mitigating some temporal and spatial attenuation of electromagnetic radiation transmission from atmosphere, and/or (ii) using an atmospheric correction algorithm to estimate surface reflectance for mitigating uncertainties associated with atmospheric scattering and absorption. Filtering the remotely sensed images may further include removing pixels representative of an obstacle, and/or removing sensed images that lack full coverage of the agricultural field.

A notification may be transmitted over a communication network in response to criteria stored on the memory being met, in which the notification includes the identification of the crop growing within the management zone of the agricultural field during the growing season.

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

The figures (FIGS.) and the subsequent description relate to preferred embodiments by way of illustration only. It should be noted that from the following discussion, alternative embodiments of the structures and methods disclosed herein will be readily recognized as viable alternatives that may be employed without departing from the disclosed principles. It is noted that wherever practicable, similar or like reference numbers may be used in the figures and may indicate similar or like functionality. The figures depict embodiments of the disclosed system (or method) for purposes of illustration only.

Overview

With an ever-growing number of available imaging platforms, it is possible for growers to get very high-frequency imagery of their fields. Commercial satellite platforms are now capable of offering sub-daily revisit frequencies, and the proliferation of commercial-grade unmanned aerial platforms allows growers to obtain their own imagery. However, this higher image frequency also means it can be impractical for growers to manually sort through and analyze all the available data obtained from their farms. Additionally, greater redundancy between images of a field can occur due to the higher revisit frequencies of imaging platforms, stemming from the fact that crop conditions generally remain stable over short time intervals (e.g., between subsequent revisits).

Satellite imagery presents many challenges in the agricultural industry because images are crop and crop-cycle dependent. For example, different stages of a crop growth cycle result in certain patterns in a vegetation index value; negative changes to the index can indicate a deleterious effects on the crops (e.g., insect damage, nutrient deficiency, hail damage, etc.), and positive changes to the index can indicate the presence of weeds in the crop cycle (e.g., prior to crop growth and/or during crop senescence). Taken on their own, changes in a vegetation index may provide a false indication of a crop type being grown in an agricultural field.

To maximize the utility of high-frequency image data, described herein is a system for automatically classifying or predicting the type of crop grown in a growing season within a field using derived image products. In one example, once a crop prediction has been made, a notification may automatically be sent to the growers or another third-party entity. A detailed description of the processes and algorithms utilized in this system follows below, including specific example implementations.

System Environment

Figure 1:
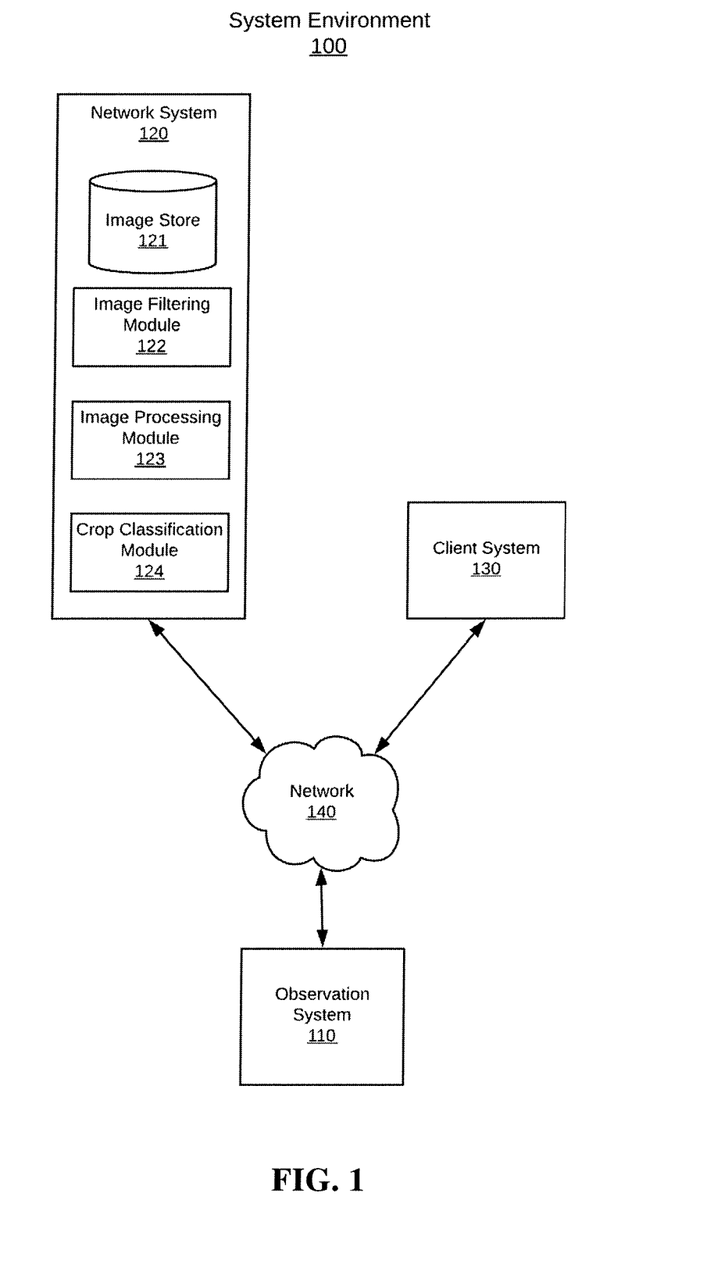
FIG. 1 illustrates a system environment for crop classification over an agricultural field using remotely-sensed image products, according to one example embodiment.

FIG. 1 illustrates a system environment for the classification of crop type for an agricultural field using remotely-sensed image products, according to one example embodiment. Within the system environment 100 is an observation system 110, network system 120, client system 130, and a network 140 which links the different systems together. The network system 120 includes an image store 121, image filtering module 122, image processing module 123, and crop classification module 124.

Other examples of a system environment are possible. For example, in various embodiments, the system environment 100 may include additional or fewer systems. To illustrate, a single client system may be responsible for multiple agricultural fields or management zones. The network system may leverage observations from multiple observation systems 110 for crop classification for each of the agricultural fields. Furthermore, the capabilities attributed to one system within the environment may be distributed to one or more other systems within the system environment 100. For example, the crop classification module 124 may be executed on the client system 110 rather than the network system 120.

An observation system 110 is a system which provides remotely-sensed data of an agricultural field. In an embodiment, the remotely-sensed data is an observed image. Herein, an observed image is an image or photograph of an agricultural field taken from a remote sensing platform (e.g., an airplane, satellite, or drone). The observed image is a raster dataset composed of pixels with each pixel having a pixel value. Pixel values in an observed image may represent some ground characteristic such as, for example, a plant, a field, or a structure. The characteristics and/or objects represented by the pixels may be indicative of the crop type within an agricultural field in the image.

The observation system 110 may provide images of an agricultural field over a network 140 to the network system 120, wherein said images may be stored in the image store 121. Additionally, or alternatively, imagery derivatives generated by the image filtering module 122, image processing module 123, or crop classification module 124 may also be stored in the image store 121.

The image filtering module 122 inputs an observed image and outputs a filtered image. The observed image may be accessed from the image store 121 or directly received from the observation system 110. A filtered image is the observed image that has been filtered such that it can be processed by the image processing module 123 and utilized for crop type prediction in the crop classification module 124.

The image processing module 123 takes filtered images provided by the image filtering module 122 and processes them through to derivative products needed by the crop classification module 124.

The crop classification module 124 uses the image derivatives provided by the image processing module 123 to classify a crop grown within an agricultural field. If certain criteria are met, the crop classification module will generate a notification to be transmitted to the client system 110 via a network 140.

Image Filtering

Filtering of images provided by the observation system 110, or retrieved from the image store 121, is performed using the image filtering module 122. Image filtering is performed to ensure images are suitable for use in automated crop classification.

There are numerous reasons why an image may be unsuitable for crop classification. Pixel values in an observed image obtained from a remote sensing platform are a measurement of electromagnetic radiation (EMR) originating from the sun (a quantity hereafter referred to as radiance), passing through the atmosphere, being reflected from objects on the Earth's surface (i.e., an agricultural field), then passing through part or all of the atmosphere once again before being received by a remote sensor (a quantity hereafter referred to as radiance). The proportion of radiance received by ground objects relative to the irradiance received by these objects (a measure hereafter referred to as surface reflectance) is of primary interest to remote-sensing applications, as this quantity may provide information on the characteristics of these objects. However, atmospheric effects can introduce detrimental impacts on the measured EMR signal in an observed image, which can render some or all of the image pixels inconsistent, inaccurate, and, generally, untenable for use in crop classification.

Atmospheric scattering and absorption is one major source of error in surface reflectance measurements. This effect is caused when molecules in the atmosphere absorb and scatter EMR. This scattering and absorption occurs in a wavelength-dependent fashion, and impacts EMR both during its initial transmission through the atmosphere, as well as after it is reflected from the Earth's surface and received by the remote sensing platform. Atmospheric absorption and scattering can cause various deleterious effects, including the following: some EMR from the sun not making it to objects on the ground, some EMR from the sun scattering back into the remote sensor before reaching the ground, and some EMR reflected from the ground not reaching the remote sensor. While the EMR output from the sun is well understood and relatively invariant, atmospheric scattering and absorption can vary markedly both over time and space, depending on the type and amount of atmospheric molecules and the path length of the EMR transmission through the atmosphere.

One adjustment for atmospheric effects is a correction of raw image data to top-of-atmosphere (TOA) reflectance units, a quantity hereafter referred to as TOA reflectance. This correction converts the radiance measured by the sensor to TOA reflectance units expressed as the ratio between the radiance being received at the sensor and the irradiance from the sun, with a correction applied based on the path of the EMR both from the sun to the target and from the target to the remote sensor. This first-order correction can mitigate some broad temporal and spatial attenuation of EMR transmission from the atmosphere, but it does not account for variable absorption and scattering, which can occur from variations in the atmospheric constituent particles.

A second-order correction, referred to here as atmospheric correction, attempts to mitigate and reduce the uncertainties associated with atmospheric scattering and absorption. A range of atmospheric correction techniques of varying complexity have been employed within the field of remote sensing. These techniques are well known to a person skilled in the art and are consequently not discussed further here. The end result from atmospheric correction is an estimate of surface reflectance. To mitigate the impact of atmospheric scattering and absorption, in some embodiments the image filtering module 122 may employ either TOA or atmospheric correction techniques.

Another source of uncertainty, which may impact observed image quality, is the presence of atmospheric clouds or haze and shadows cast from clouds, which can occlude ground objects and/or attenuate the radiance reflected from these objects. As such, the image filtering module 122 may utilize a cloud and/or shadow masking technique to detect pixels afflicted by these effects. Many techniques exist within the discipline for cloud and shadow masking and are also well known to a person skilled in the art.

The image filtering module 122 may also remove pixels from an observed image (e.g., using cropping, selective deletion, etc.). For example, an observed image may include obstacles or structures (e.g., farm houses, roads, farm equipment) that may be detrimental to assessment of the type of crops being grown within the field. The image filtering module 122 removes the impacted pixels by, for example, cropping out pixels from the observed image. Pixels impacted by clouds, shadows, and/or haze as detected by a cloud and shadow detection algorithm can also be removed in a similar fashion. The resulting image is an image that provides more accurate data for crop classification.

In some cases the number of deleterious pixels in an image may exceed some critical threshold, thereby preventing the image from being useful in crop classification. Similarly, some images may lack full coverage of an agricultural field of interest. In such cases, the image filtering module 122 may remove an image from further processing and it will not be used in crop classification.

Furthermore, the image filtering module 122 may also remove images that have been taken at a date not in the growing season. The automatic crop classification module 124 uses a crop classification model that has been trained using historical data or images of crops grown during a growing season. Therefore, any newly observed images not taken during the growing season are removed to provide a more accurate classification of crop type.

Images that have been processed through the image filtering module 122 are hereafter referred to as filtered images.

Image Processing

Filtered images are passed from the image filtering module 122 to the image processing module 123. The image processing module processes the filtered images into derivatives needed by the crop classification module 124.

Figure 2:
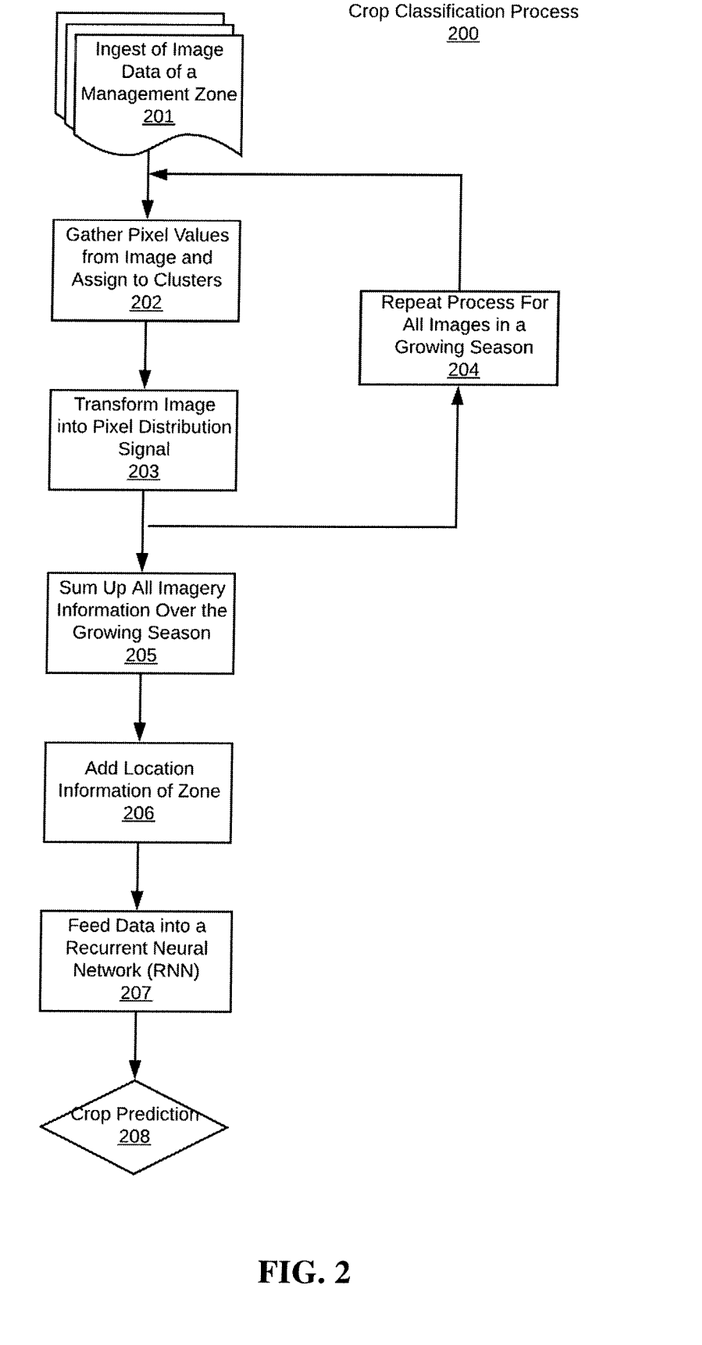
FIG. 2 illustrates the process for automatic crop classification method according to one example embodiment.

FIG. 2 is a block diagram that illustrates the automatic crop classification method 200 according to one example embodiment.

At step 201, remotely-sensed imagery data that has been filtered by the filtering module 122 is retrieved from the image store 121. The image represents a specific management zone that has been previously defined. Remotely-sensed images contain pixel values that depend on the type of satellite used to gather the images. Examples of satellites that may be used to obtain imagery data are PlanetScope™ (4 bands—R, G, B, NIR), RapidEye™ (5 bands—R, G, B, RedEdge, NIR), and LandSat8™ (8 bands—focused on R, G, B, NIR, SWIR1, SWIR2). However, other satellites may be included using the same methodology.

At step 202, the image processing module 123 gathers the image pixel values and also computes vegetation indices (VIs) from input filtered images. Vegetation indices are derivatives created through mathematical operations performed on different image spectral bands, wherein a spectral band represents reflectance data measured over a specific wavelength range of EMR. The result from a VI calculation is a new image where each pixel value of the new image is an indexed pixel value that corresponds with the VI value calculated from the original band values for that pixel in the original image. Vegetation indices have long been used for remote sensing of vegetation since they often demonstrate high correlations with vegetation properties of interest, such as biomass, photosynthetic activity, crop yield, etc. As an example, the image processing module 123 may compute the Normalized Difference Vegetation Index (NDVI). The NDVI is calculated as follows:

$$NDVI = \frac{NIR - \text{Red}}{NIR + \text{Red}} \quad (1)$$

where NIR is the image reflectance in the near infrared (NIR) band, and Red is the image reflectance in the Red band. The NDVI is expressed as a decimal value between −1 and 1. NDVI values in the range of 0.2 to 0.8 or higher are typically considered an indication of active vegetation, with higher values being correlated with higher biomass, photosynthetic activity, etc. While the NDVI has been used in this example embodiment, other embodiments may utilize any other vegetation index or combination of indices.

Figure 4:
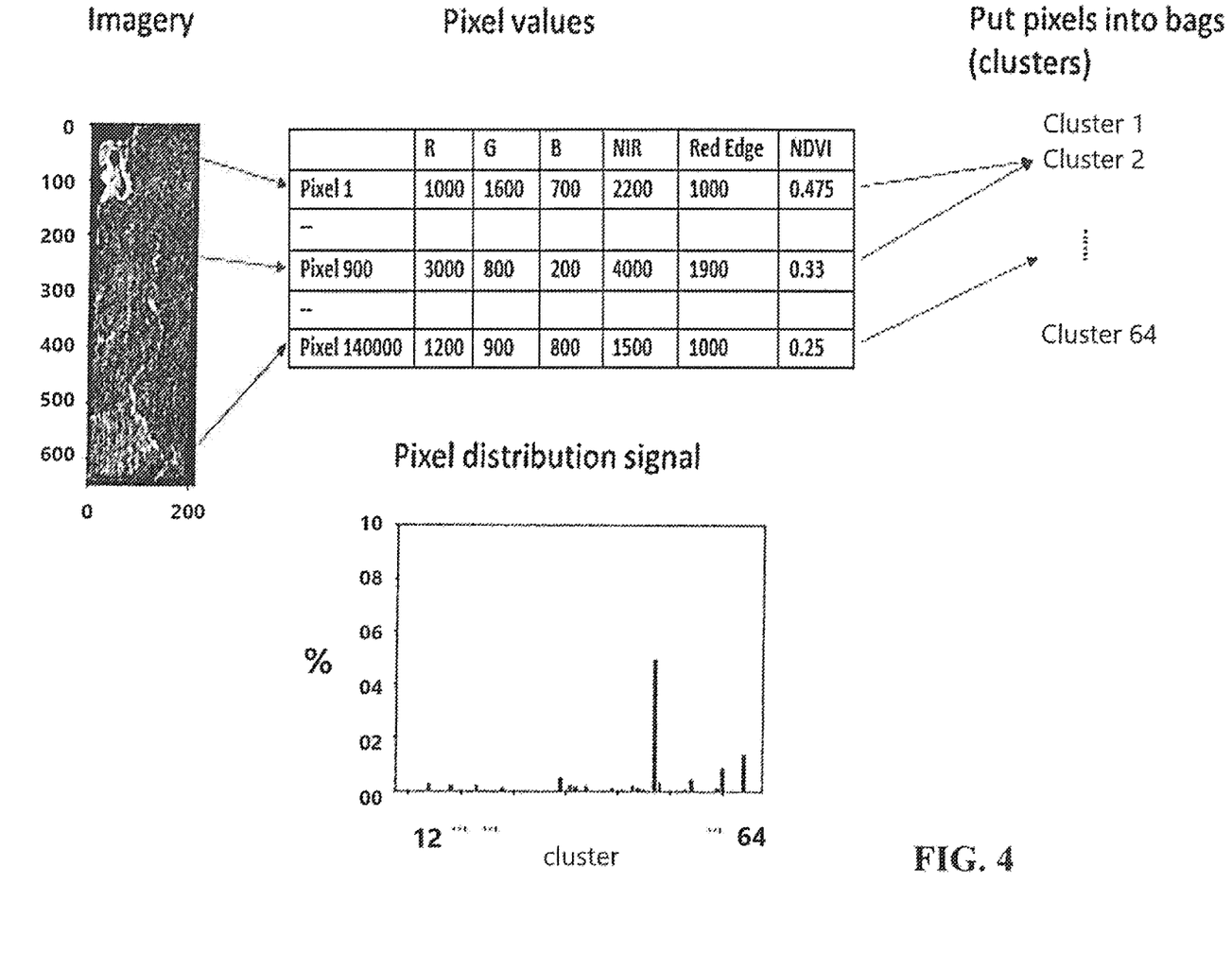
FIG. 4 illustrates a general overview of the pixel clustering process implemented by the image processing module.

Once all the pixel values are gathered and the NDVI values are computed, then the indexed pixel values of the pixels are assigned to 64 different clusters. At step 203, the image is then transformed into a pixel distribution signal wherein the image then becomes a 64-dimensional vector containing a pixel distribution in each cluster. Each cluster thus represents a group of pixels having indexed pixel values within a prescribed range associated with that cluster. FIG. 4 illustrates a general overview of the pixel clustering process implemented by the image processing module 123.

At step 204, the image processing module 123 repeats steps 201 to 203 for each image in the growing season. The growing season in North America is defined as April 1st to September 30th; however, this method may be modified depending on the geographic region to which it is applied. There are approximately 180 days in this growing season that are evenly split into 32 time steps, resulting in approximately six days per time step.

Crop Classification

At step 205, the temporal imagery data, that is the pixel distributions signals from the image processing noted above, is transformed into a time series signal, referred to herein as a temporal representation. All imagery signals, or pixel distributions signals, (i.e., the 64-dimensional vectors) within the same time step will be simply summed together and normalized by dividing the sum of the vector itself to generate a pixel distribution vector representative of that time step. This results in 32 pixel distribution vectors, in which each pixel distribution vector represents all pixel distributions signals for a given time step. These pixel distribution vectors are transformed into the temporal representation in the form of a matrix, and the result will be a 32×64 matrix for each management zone, which contains all imagery information over the growing season.

At step 206, the crop classification module 124 assigns the management zone coordinates in a universal coordinate system. Generally, received observed images include a projection that portrays a portion of the Earth's three-dimensional surface as a two-dimensional observed image. The crop classification module 124 assigns coordinates to the observed management zone that defines how the two-dimensional projection of the three-dimensional surface is related to real places on the Earth. For example, the crop classification module 124 may assign latitude and longitude coordinates.

In some cases, observed images may already include coordinates in a coordinate system that is not the universal coordinate system. For example, different observation systems may project Earth's three-dimensional surfaces as a two-dimensional observed image using different projection techniques and coordinate reference systems. In another example, some observed images have a coordinate system that are accurate for only certain areas on the Earth's surface (e.g., Universal Transverse Mercator zones). In these cases, the coordinates of the observed management zone is converted to the universal coordinate system. As an example, the crop classification module 124 may assign coordinates to observed management zones in the EPSG 4326-WGS 84 coordinate system. Normalizing coordinate systems to a universal coordinate system is beneficial when tracking images between agricultural fields or comparing multiple agricultural fields.

At step 207, the temporal representation is fed into a Recurrent Neural Network (RNN). The use of Recurrent Neural Networks is known to a person skilled in the art of machine learning; however, necessary modifications in model structure, time step setting, cutoff edges, etc., are needed to adapt to this model's data set. The RNN is trained using a dataset consisting of thousands of satellite images that are stored in the image store 121. Steps 201 to 207 are repeated for all management zones until the RNN is trained. Since there are a large number of management zones and an even larger number of images, the pixels are assigned to 64 different clusters by an unsupervised K-Means clustering algorithm using Euclidean distance on subsample pixels. Once the K-means is pre-trained, then all the pixels in the images are used to gather pixel values and are assigned to clusters when predicting crop classification of the current growing season for a specific management zone.

At step 208, the crop classification module 124 predicts the type of crop that was grown during the growing season associated with the specific management zone, according to the location coordinates of the images. The network system 120 transmits a notification including the predicted crop type to the client system 130 via the network 140. In some examples, the network system 120 may automatically transmit a predicted crop type to the client system 130 if a predicted crop type is a particular crop. Furthermore, the notification may be transmitted independently from receiving a request for the notification.

Example Computer System

Figure 3:
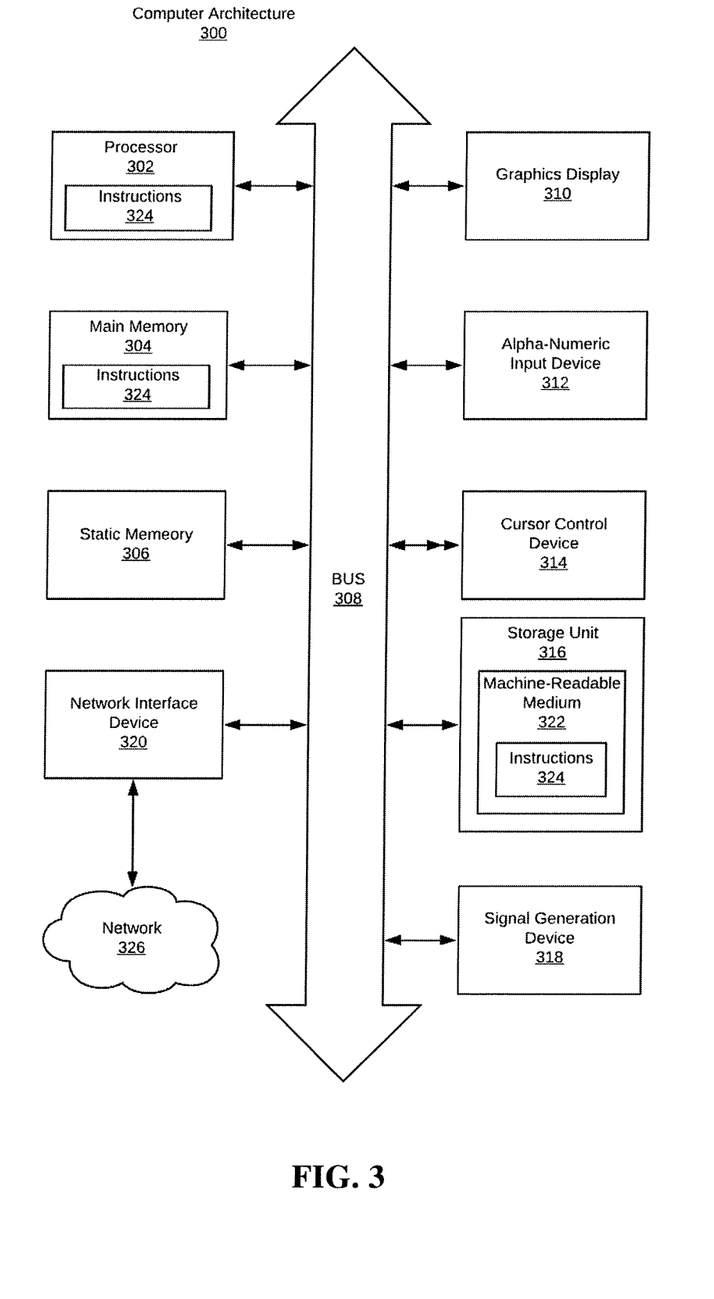
FIG. 3 is a block diagram illustrating components of an example machine for reading and executing instructions from a machine-readable medium, according to one example embodiment.

FIG. 3 is a block diagram illustrating components of an example machine for reading and executing instructions from a machine-readable medium. Specifically, FIG. 3 shows a diagrammatic representation of network system 120 and client device 130 in the example form of a computer system 300. Thus, the computer system implements method 200 of FIG. 2. The computer system 300 can be used to execute instructions 324 (e.g., program code or software) prompting the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes one or more processing units (generally processor 302). The processor 302 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 300 also includes a main memory 304. The computer system may include a storage unit 316. The processor 302, memory 304, and the storage unit 316 communicate via a bus 308.

In addition, the computer system 300 can include a static memory 306, a graphics display 310 (e.g., to drive a plasma display panel (PDP), a liquid crystal display (LCD), or a projector). The computer system 300 may also include alphanumeric input device 312 (e.g., a keyboard), a cursor control device 314 (e.g., a mouse, a trackball, a joystick, a motion sensor, or other pointing instrument), a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. For example, the instructions 324 may include the functionalities of modules of the client device 130 or network system 120 described in FIG. 1. The instructions 324 may also reside, completely or at least partially, within the main memory 304 or within the processor 302 (e.g., within a processor's cache memory) during execution thereof by the computer system 300, the main memory 304 and the processor 302, also constituting machine-readable media. The instructions 324 may be transmitted or received over a network 326 (e.g., network 120) via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store the instructions 324. The term "machine-readable medium" shall also be taken to include any medium that is capable of storing instructions 324 for execution by the machine and that cause the machine to perform any one or more of the methodologies disclosed herein. The term "machine-readable medium" includes, but is not be limited to, data repositories in the form of solid-state memories, optical media, and magnetic media.

Various methods, apparatus, and systems have been disclosed herein. The present invention contemplates numerous variations, options, and alternatives and is not to be limited to the specific embodiments provided herein.

The invention claimed is:

1. A method of classifying a crop growing within a management zone of an agricultural field during a growing season, the method comprising:
   receiving a plurality of remotely sensed images of the management zone of the agricultural field acquired during the growing season;
   for each remotely sensed image, obtaining pixel values from the remotely sensed images and computing vegetation indices;
   for each remotely sensed image, using the computed vegetation indices to assign the pixel values into clusters defining a pixel distribution signal, in which the pixel distribution signal comprises a multi-dimensional vector representing the clusters and containing a pixel distribution within each, cluster, and in which each cluster represents a group of pixels having indexed pixel values within a prescribed range associated with that cluster;
   transforming the pixel distribution signals of all sensed images of the management zone for the growing season into a temporal representation of the management zone, in which the temporal representation comprises a matrix comprised of a plurality of pixel distribution vectors at different time steps during the growing season in which each pixel distribution vector of the matrix represents a plurality of the pixel distribution signals at a common one of the time steps during the growing season;
   providing location information for the management zone with the temporal representation; and
   applying a recurrent neural network to the temporal representation and the location information for the management zone to identify the crop growing within the management zone of the agricultural field during, the growing season.

2. The method according to claim 1 including classifying a crop growing within an agricultural field including a plurality of management zones, the method further comprising:
   receiving the remotely sensed images of the plurality of management zones;

associating the pixel distribution signals with the management zones;

for each management zone, transforming the pixel distribution signals into the temporal representation for the management zone; and applying the recurrent neural network to the temporal representations and the location information for the management zones to identify the crop growing within the management zones of the agricultural field during the growing season.

3. The method according to claim 1 including (i) computing the vegetations indices by calculating indexed pixel values for each sensed image in which the indexed pixel values correspond to the vegetation indices calculated from original band values for the pixels in the sensed images and (ii) assigning the indexed pixel values into the clusters to define the pixel distribution signal.

4. The method according to claim 1 including assigning the pixel values into the clusters to define the pixel distribution signal using an unsupervised k-means clustering algorithm.

5. The method according to claim 1 including computing each pixel distribution vector associated with one time step of the matrix by summing and normalizing the pixel distribution signals associated with that time step.

6. The method according to claim 1 including identifying the location information for the management zone by converting coordinate information associated with the management zone into a universal coordinate system usable by the recurrent neural network.

7. The method according to claim 1 including filtering the remotely sensed images to produce filtered images and obtaining the pixel values only from the filtered images.

8. The method according to claim 7 including filtering the remotely sensed images by correcting raw image data to top of atmosphere reflective units for mitigating some temporal and spatial attenuation of electromagnetic radiation transmission from atmosphere.

9. The method according to claim 7 including filtering the remotely sensed images using an atmospheric correction algorithm to estimate surface reflectance for mitigating uncertainties associated with atmospheric scattering and absorption.

10. The method according to claim 7 including filtering the remotely sensed images to remove pixels representative of an obstacle.

11. The method according to claim 7 including filtering the remotely sensed images to remove sensed images that lack full coverage of the agricultural field.

12. The method according to claim 1 including transmitting a notification over a communication network in response to criteria stored on the memory being met, the notification including the identification of the crop growing within the management zone of the agricultural field during the growing season.

13. A system for classifying a crop growing within a management zone of an agricultural field during a growing season, the system comprising:

a memory storing programming instructions thereon;

at least one processor operably coupled to the memory so as to execute the programming instructions whereby said at least one processor is configured to:

receive a plurality of remotely sensed images of the management zone of the agricultural field acquired during the growing season;

for each remotely sensed image, obtain pixel values from the remotely sensed images and compute vegetation indices;

for each remotely sensed image, use the computed vegetation indices to assign the pixel values into clusters defining a pixel distribution signal, in which the pixel distribution signal comprises a multi-dimensional vector representing the clusters and containing a pixel distribution within each cluster, and in which each cluster represents a group of pixels having indexed pixel values within a prescribed range associated with that cluster;

transform the pixel distribution signals of all sensed images of the management zone for the growing season into a temporal representation of the management zone, in which the temporal representation comprises a matrix comprised of a plurality of pixel distribution vectors at different time steps during the growing season in which each pixel distribution vector of the matrix represents a plurality of the pixel distribution signals at a common one of the time steps during the growing season;

include location information for the management zone with the temporal representation; and apply a recurrent neural network to the temporal representation and the location information for the management zone to identify the crop growing within the management zone of the agricultural field during the growing season.

14. The system according to claim 13 wherein the agricultural field includes a plurality of management zones and wherein said at least one processor is further configured to:

receive the remotely sensed images of the plurality of management zones;

associate the pixel distribution signals with the management zones;

for each management zone, transform the pixel distribution signals into the temporal representation; and apply the recurrent neural network to the temporal representations and the location information for the management zones to identify the crop growing within the management zones of the agricultural field during the growing season.

15. The system according to claim 13 wherein said at least one processor is further configured to (i) compute the vegetations indices by calculating indexed pixel values for each sensed image in which the indexed pixel values correspond to the vegetation indices calculated from original band values for the pixels in the sensed images and (ii) assign the indexed pixel values into the clusters to define the pixel distribution signal.

16. The system according to claim 13 wherein said at least one processor is further configured to assign the pixel values into the clusters to define the pixel distribution signal using an unsupervised k-means clustering algorithm.

* * * * *